United States Patent
Wu

(10) Patent No.: US 10,128,787 B2
(45) Date of Patent: Nov. 13, 2018

(54) DETECTION OF ROTOR LOCK

(71) Applicant: Infineon Technologies Americas Corp., El Segundo, CA (US)

(72) Inventor: Wei Wu, El Segundo, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 0 days.

(21) Appl. No.: 15/379,185

(22) Filed: Dec. 14, 2016

(65) Prior Publication Data

US 2018/0167015 A1    Jun. 14, 2018

(51) Int. Cl.
| D06F 37/30 | (2006.01) |
| G05B 11/28 | (2006.01) |
| H02P 6/12 | (2006.01) |
| H02P 29/024 | (2016.01) |
| H02P 23/00 | (2016.01) |
| H02P 23/14 | (2006.01) |

(52) U.S. Cl.
CPC ........ *H02P 29/024* (2013.01); *H02P 23/0004* (2013.01); *H02P 23/14* (2013.01)

(58) Field of Classification Search
CPC .......... D06F 37/304; G05B 11/28; H02P 6/12
USPC ................................... 702/60; 318/599, 721
See application file for complete search history.

(56) References Cited

U.S. PATENT DOCUMENTS

| 7,342,379 | B2 | 3/2008 | Marcinkiewicz et al. |
| 7,583,049 | B2 | 9/2009 | Marcinkiewicz et al. |
| 2002/0060544 | A1* | 5/2002 | Teutsch .................. G05B 11/28 318/599 |
| 2005/0218862 | A1* | 10/2005 | Huggett .................. H02P 21/26 318/722 |
| 2009/0056385 | A1* | 3/2009 | Maekawa ............. D06F 37/304 68/12.16 |
| 2009/0119036 | A1* | 5/2009 | Jayanth ................. F04B 49/065 702/60 |

(Continued)

FOREIGN PATENT DOCUMENTS

| JP | 2003319698 A | 11/2003 |
| JP | 41112265 B2 | 4/2008 |

OTHER PUBLICATIONS

"Sensorless Field Oriented Control for PMSM Motors," Infineon, AP08059, V1.0, May 2007, 29 pp.

(Continued)

*Primary Examiner* — Bentsu Ro
*Assistant Examiner* — Cortez Cook
(74) *Attorney, Agent, or Firm* — Shumaker & Sieffert, P.A.

(57) ABSTRACT

In some examples, a controller device is configured to generate control signals for a power-conversion circuit that drives an electric motor including a rotor. In some examples, the controller device includes subtraction circuitry configured to generate an error signal based on a difference between an estimated angular velocity of the rotor and a target angular velocity for the rotor. In some examples, the controller device further includes proportional-integral (PI) circuitry configured to generate a reference torque signal based on the error signal. In some examples, the controller device also includes processing circuitry configured to determine that the rotor is locked based on detecting that the reference torque signal includes a saturated amplitude for at least a threshold time.

20 Claims, 7 Drawing Sheets

(56) References Cited

U.S. PATENT DOCUMENTS

2013/0057193 A1\* 3/2013 Iwaji ...................... H02P 6/185
　　　　　　　　　　　　　　　　　　　　　　318/721
2017/0126153 A1\* 5/2017 Lepka ................... H02P 29/021

OTHER PUBLICATIONS

Cheles, Sensorless Field Oriented Control (FOC) of an AC Induction Motor (ACIM), Microchip, AN1162, Jan. 2008, 34 pp.
"Field Orientated Control of 3-Phase AC-Motors," Texas Instruments Incorporated, Feb. 1998, 24 pp.
"IRMCK099 Application Guide," Infineon, Rev 1.0, Sep. 8, 2016, 76 pp.
"Speed PI Regulator," Allen-Bradley, 1336 Impact AC Drive, Jun. 2000, 8 pp.

\* cited by examiner

DETECTION OF ROTOR LOCK

TECHNICAL FIELD

This disclosure relates to the control of electric motors.

BACKGROUND

An electric motor converts electricity into mechanical power in the form of a rotating shaft known as a rotor. The angular velocity of the rotor may be based on the electricity flowing through field windings in the stator of the electric motor. A controller device may implement a method known as field-oriented control (FOC), also known as vector control, to determine the amplitude of the electrical current that should flow through each field winding of the stator.

A controller device using FOC may measure or estimate the electrical currents through the field windings and determine the desired electrical currents to flow through the field windings. The controller device may include one or more feedback loops designed to regulate the electrical currents to their desired levels. A controller device that implements sensorless FOC may also include circuitry configured to estimate the angular velocity of the rotor. The controller device may compare the estimated angular velocity to the desired angular velocity to determine an error signal for the angular velocity. To correct the angular velocity to the desired angular velocity, the controller device may control the electrical currents through the field windings based on the error signal for the angular velocity.

Rotor lock is a condition in which the rotor of an electric motor is partially or fully obstructed. Many different events may cause rotor lock, depending on the environment of the electric motor. For example, an object may enter the electric motor and contact the rotor, causing rotor lock. In another example, an internal component of the electric motor may malfunction or dislodge, causing rotor lock. In some examples, the rotor may have nonzero angular velocity during rotor lock, such as when the rotor is partially obstructed.

SUMMARY

This disclosure describes techniques for detecting a condition of rotor lock in an electric motor, which may occur when the rotor is partially or fully obstructed. A controller device may be configured to estimate the angular velocity of the rotor, but the estimate may not necessarily be accurate when the rotor is locked. To determine if the rotor is locked, the controller device may monitor a reference torque signal that is generated by proportional-integral (PI) circuitry. If the reference torque signal reaches and maintains a saturated amplitude for a threshold amount of time, the controller device may determine that the rotor is locked.

In some examples, a controller device is configured to generate control signals for a power-conversion circuit that drives an electric motor including a rotor. The controller device includes subtraction circuitry configured to generate an error signal based on a difference between an estimated angular velocity of the rotor and a target angular velocity for the rotor. The controller device further includes PI circuitry configured to generate a reference torque signal based on the error signal. The controller device also includes processing circuitry configured to determine that the rotor is locked based on detecting that the reference torque signal includes a saturated amplitude for at least a threshold time.

In some examples, a method includes determining that a rotor of an electric motor is locked, and generating an error signal based on a difference between an estimated angular velocity of the rotor and a target angular velocity for the rotor. The method further includes generating a reference torque signal based on the error signal, and detecting that the reference torque signal includes a saturated amplitude for at least a threshold time.

In some examples, a system includes an electric motor including a rotor and field windings, power-conversion circuitry configured to drive the electric motor, and a controller device configured to generate control signals for the power-conversion circuit. The controller device includes subtraction circuitry configured to generate an error signal based on a difference between an estimated angular velocity of the rotor and a target angular velocity for the rotor. The controller device further includes velocity PI circuitry configured to generate a reference torque signal based on the error signal. The controller device also includes processing circuitry configured to determine that the rotor is locked based on detecting that the reference torque signal includes a saturated amplitude for at least a threshold time.

The details of one or more examples are set forth in the accompanying drawings and the description below. Other features, objects, and advantages will be apparent from the description and drawings, and from the claims.

DETAILED DESCRIPTION

A controller device may cause power-conversion circuitry to deliver electrical currents to the field windings of an electric motor. To cause a rotor of the electric motor to rotate at a target angular velocity, the controller device may compare an estimate of the angular velocity of the rotor to a target angular velocity for the rotor. The controller device may create an error signal based on the difference between the estimated angular velocity and the target angular velocity. Proportional-integral (PI) circuitry of the controller device may generate a reference torque signal based on the error signal.

The PI circuitry may include one or more limits for the reference torque signal. The reference torque signal may "saturate" when the amplitude of the reference torque signal reaches one of the limits of the PI circuitry. Processing circuitry of the controller device may monitor the reference torque signal and detect if the reference torque signal is saturated. The processing circuitry may determine that the rotor is locked based on detecting that the reference torque signal is saturated for a certain period of time. In some examples, a positive error signal may indicate that the estimated angular velocity is slower than the target angular velocity. If the estimated angular velocity is consistently slower than the target angular velocity, the reference torque signal may saturate at an upper limit. If the reference torque signal remains saturated for a threshold time duration, the processing circuitry may determine that the angular velocity rotor has been slower than the target angular velocity for an extended period of time, which may be indicative of rotor lock. A saturated reference torque signal may indicate that the controller device is unable to increase the angular velocity of the rotor because of an obstruction or a lock condition.

The techniques of this disclosure may allow a controller device to determine that a rotor is locked in the absence of a position sensor and/or a velocity sensor. For sensorless controller devices, the controller device's estimate of the angular velocity of the rotor may not necessarily be accurate. By monitoring the amplitude of the reference torque signal, the processing circuitry may easily determine that the rotor is locked. Monitoring of the amplitude of the reference torque signal may not require any additional equipment for a controller device that already includes PI circuitry that is configured to generate a reference torque signal. Moreover, quickly determining when the rotor is locked may protect the electric motor from damage caused by sustained rotor lock.

Figure 1:
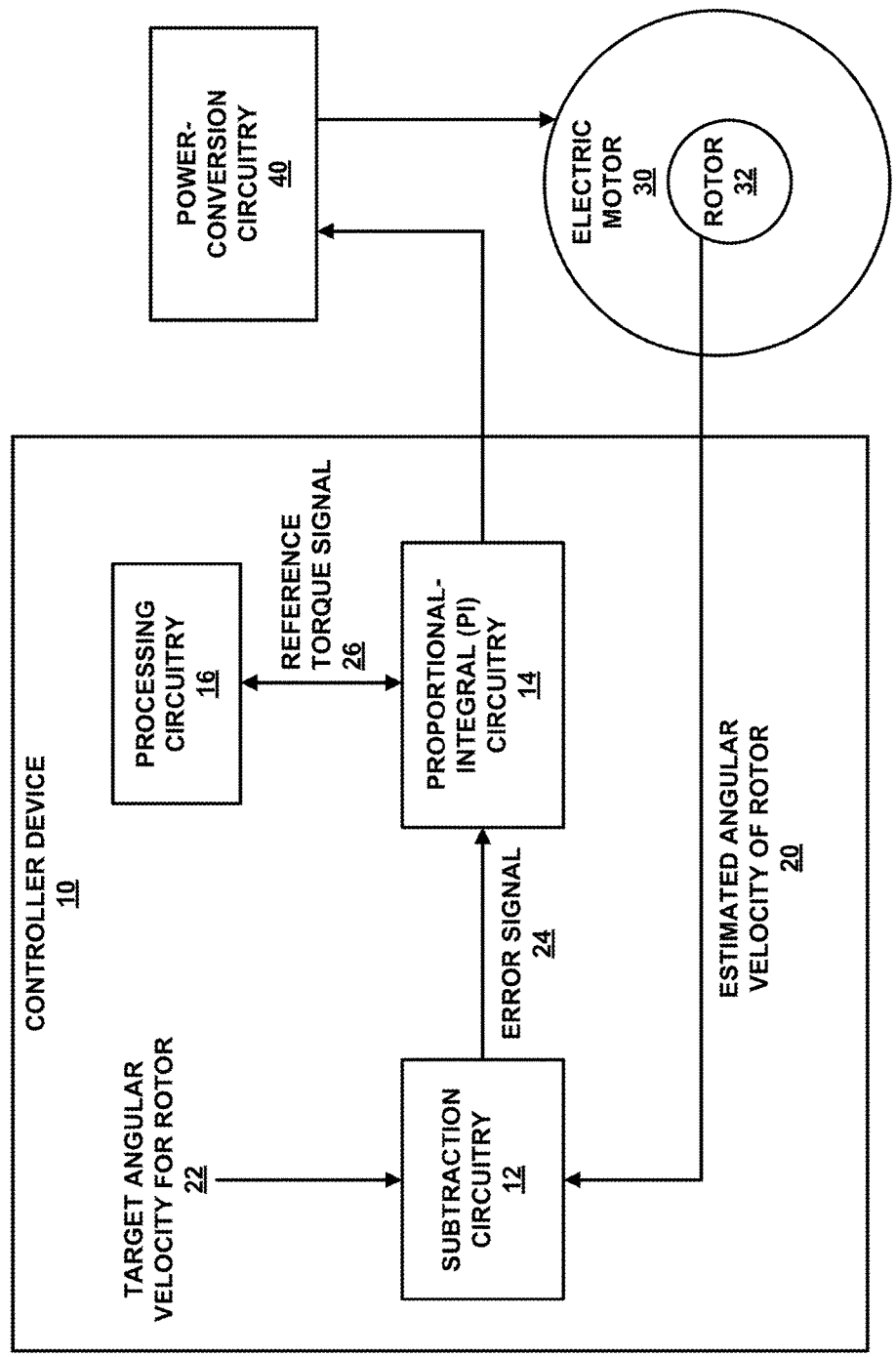
FIG. 1 is a conceptual block diagram of a controller device including proportional-integral (PI) circuitry configured to generate a reference torque signal based on an error signal, in accordance with some examples of this disclosure.

FIG. 1 is a conceptual block diagram of a controller device 10 including PI circuitry 14 configured to generate a reference torque signal 26 based on an error signal 24, in accordance with some examples of this disclosure. Controller device 10 may be configured to generate control signals to cause power-conversion circuitry 40 to drive rotor 32 of electric motor 30. In some examples, controller device 10 may implement field-oriented control (FOC), which may be known as vector control, to determine the control signals to transmit to power-conversion circuitry 40. In some examples, controller device 10 may operate without a sensor configured to sense the position and/or angular velocity of rotor 32. However, the techniques of this disclosure may also be useful if controller device 10 includes a sensor configured to sense the position and/or angular velocity of rotor 32.

Controller device 10 is configured to determine estimated angular velocity 20 of rotor 32. Controller device 10 may receive the electrical currents flowing through the field windings of electric motor 30. Controller device 10 may include a flux estimator and phase-lock loop (PLL) (not shown in FIG. 1) that are configured to determine estimated angular velocity 20 of rotor 32 based on the electrical currents through the field windings.

Subtraction circuitry 12 is configured to generate error signal 24 based on a difference between estimated angular velocity 20 and target angular velocity 22. Controller device 10 may determine target angular velocity 22 based on, for example, the operating conditions for electric motor 30, user input, or any other information. Subtraction circuitry 12 may include one or more switches and/or digital logic configured to subtract estimated angular velocity 20 from target angular velocity 22. Subtraction circuitry 12 may be configured to execute instructions programmed on the circuitry of controller device 10 to generate error signal 24. If estimated angular velocity 20 is equal to target angular velocity 22, subtraction circuitry 12 may generate error signal 24 with zero amplitude.

PI circuitry 14 is configured to generate reference torque signal 26 based on error signal 24. PI circuitry 14 may be known as "velocity PI circuitry" or "speed PI circuitry" if controller device 10 includes additional PI circuitry. PI circuitry 14 may include integration circuitry configured to integrate error signal 24 over time. PI circuitry 14 may also include amplifier circuitry configured to amplify error signal 24. The amplifier circuitry may include one or more transistors. PI circuitry 14 may also include circuitry to add the integrated signal to the amplified signal. PI circuitry 14 may be configured to execute instructions programmed on the circuitry of controller device 10 to generate reference torque signal 26. PI circuitry 14 may output the sum of the integrated signal and the amplified signal as reference torque signal 26. In some examples, reference torque signal 26 may comprise a voltage signal and/or a digital signal. In some examples, estimated angular velocity 20, target angular velocity 22, error signal 24, and reference torque signal 26 may include digital signals.

Reference torque signal 26 may indicate a desired amount of torque for electric motor 30. Based on reference torque signal, controller device 10 may generate control signals that cause power-conversion circuitry 40 to transmit electrical currents of desired amplitudes to electric motor 30. Error signal 24 may accumulate in reference torque signal 26 such that a consistent, nonzero value of error signal 24 causes reference torque signal to grow in the positive or negative direction. For example, if estimated angular velocity 20 is less than target angular velocity 22, error signal 24 may include a positive amplitude, and reference torque signal 26 may increase. If reference torque signal 26 includes a positive amplitude, controller device 10 may cause power-conversion circuitry 40 to transmit electrical currents through the field windings of electric motor 30 to increase the angular velocity of rotor 32.

PI circuitry 14 may include an upper limit and a lower limit for the amplitude of reference torque signal 26. When the amplitude of reference torque signal 26 reaches a limit, reference torque signal 26 may include a "saturated amplitude," which may also be referred to as "saturated." In some examples, the upper limit may include a positive voltage, and the lower limit may include a negative voltage or a reference-ground voltage. In some examples, each of the limits may include an electrical current amplitude or a digital value if reference torque signal 26 is a digital signal. If the amplitude of reference torque signal 26 reaches a limit, PI circuitry 14 may cause reference torque signal 26 to remain at the limit until error signal 24 switches polarity. For example, if estimated angular velocity 20 is less than target angular velocity 22, error signal 24 may include a positive amplitude, and the amplitude of reference torque signal 26 may increase to the upper limit. The amplitude of reference torque signal 26 may remain at the upper limit until error signal 24 includes a negative amplitude due to estimated angular velocity 20 being greater than target angular velocity 22.

In accordance with the techniques of this disclosure, processing circuitry 16 may determine that rotor 32 is locked based on detecting that reference torque signal 26 includes a saturated amplitude for at least a threshold time. Processing circuitry 16 may include sensing circuitry configured to monitor reference torque signal 26 and determine if reference torque signal 26 is saturated. Processing circuitry 16 may be configured to execute instructions programmed on the circuitry of controller device 10 to detect that reference torque signal 26 is saturated. Processing circuitry 16 may continuously check whether reference torque signal 26 is saturated by sampling reference torque signal 26 at a sampling rate, such as one hertz, ten hertz, one hundred hertz, or any other suitable sampling rate. If processing circuitry 16 determines that reference torque signal 26 is saturated, processing circuitry 16 may set a timer configured to expire after the threshold time, which may also be known as threshold duration of time. If reference torque signal 26 is saturated after the threshold time, processing circuitry 16 may determine that rotor 32 is locked. In some examples, processing circuitry 16 may continuously monitor reference torque signal 26 during the threshold time and refrain from determining that rotor 32 is locked if reference torque signal 26 becomes unsaturated before the end of the threshold time. If reference torque signal 26 becomes unsaturated before the end of the threshold time, processing circuitry 16 may reset the timer. In some examples, the threshold time may be one, five, ten, twenty, thirty, or sixty seconds, or the threshold time may be configurable by the user of controller device 10.

To avoid false positives, processing circuitry 16 may refrain from monitoring reference torque signal 26 if estimated angular velocity 20 is greater than a threshold angular velocity. In some examples, the threshold angular velocity may be twenty percent, twenty-five percent, or thirty percent of a maximum angular velocity for rotor 32. The maximum angular velocity may be an operating limit for rotor 32 that is set at the time of manufacture. In some examples, the design of power-conversion circuitry 40 may affect the maximum angular velocity. At higher angular velocities, vibration of rotor 32 may disrupt the determination of rotor lock by detecting saturation of reference torque signal 26.

By using reference torque signal 26 to detect rotor lock, processing circuitry 16 may detect rotor lock without a position sensor or a velocity sensor on rotor 32. In some examples, processing circuitry 16 may detect rotor lock without any additional equipment and/or hardware, as compared to another controller device that implements sensorless FOC. In other examples, however, processing circuitry 16 may detect rotor lock without high-frequency injection, but this approach may require additional computation power and/or cause acoustic noise.

Upon determining rotor lock, processing circuitry 16 may set a flag in a register of controller device 10 and output diagnostic information to a user indicating the rotor lock. Processing circuitry 16 may also output an alarm or an alert based on determining rotor lock. In some examples, based on determining rotor lock, processing circuitry 16 may terminate the operation of electric motor 30 to prevent damage to electric motor 30 from the rotor lock.

Electric motor 30 may include rotor 32 and one or more field windings. The field windings may be positioned in an armature of the electric motor 30. In some examples, electric motor 30 may include a three-phase motor with three field windings, wherein each field winding is configured to receive an electrical current from power-conversion circuitry 40. The field windings may be positioned in the armature, which may also be known as the stator, and/or in rotor 32. The stator may surround rotor 32, and in some electric motors, the stator may rotate at a different angular velocity than rotor 32. In some examples, the stator may include permanent magnets, and rotor 32 may include the field windings.

Power-conversion circuitry 40 may include transistors configured to convert one form of electrical power to another form of electrical power. Power-conversion circuitry 40 may include one or more phases, where each phase of power-conversion circuitry 40 may include a half-bridge circuit. Controller device 10 may be configured to control the transistors of power-conversion circuitry 40 by transmitting pulse-width-modulated (PWM) control signals to the control terminals of the transistors of power-conversion circuitry 40. Controller device 10 may include an integrated gate driver, or controller device 10 may transmit PWM signals to a discrete gate driver configured to generate control signals for power-conversion circuitry 40.

Figure 2:
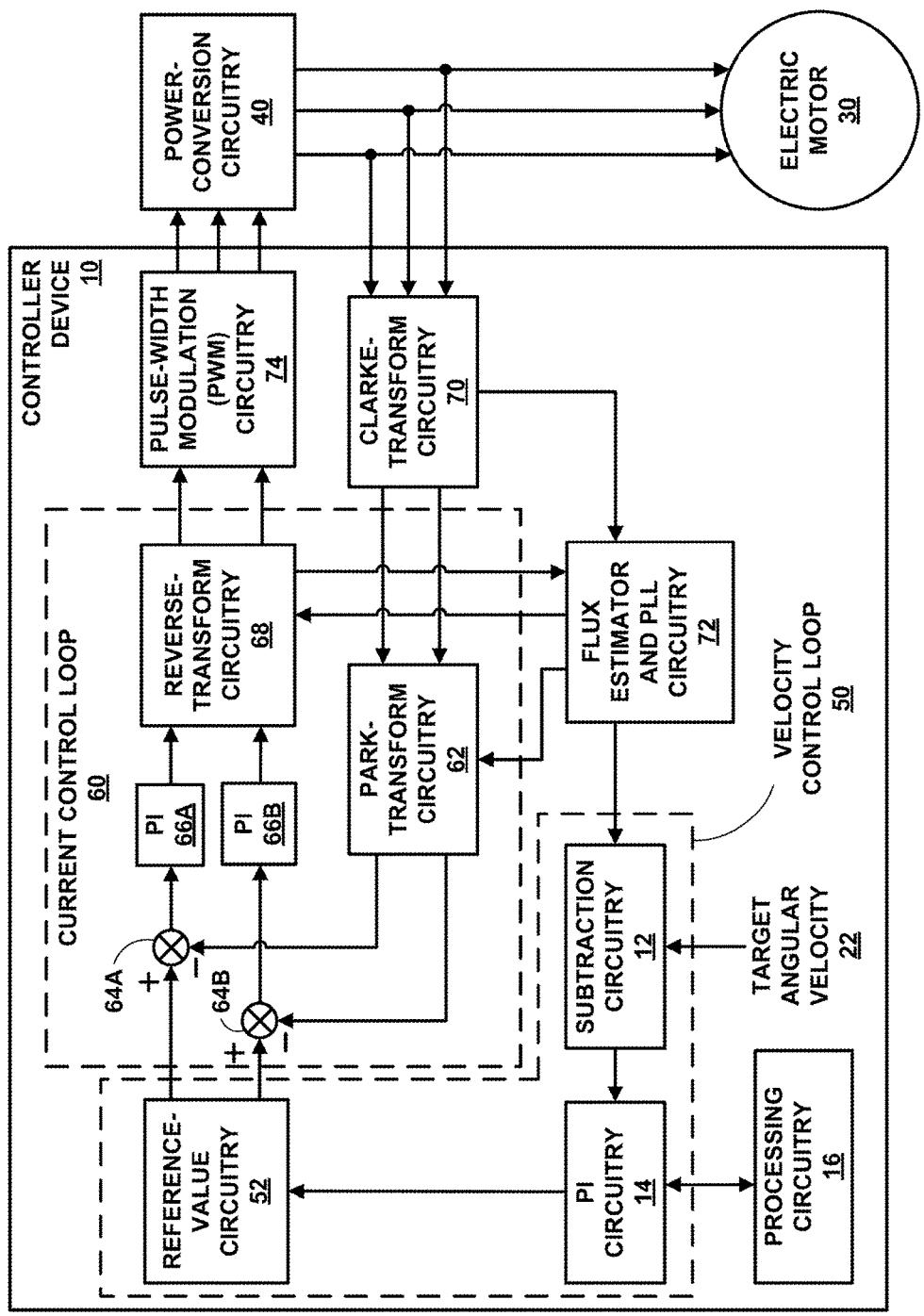
FIG. 2 is a conceptual block diagram of a controller device including a velocity control loop and a current control loop, in accordance with some examples of this disclosure.

FIG. 2 is a conceptual block diagram of controller device 10 including a velocity control loop 50 and a current control loop 60, in accordance with some examples of this disclosure. Velocity control loop 50 may include subtraction circuitry 12, PI circuitry 14, and reference-value circuitry 52. Current control loop 60 may include Park-transform circuitry 62, subtraction circuitry 64A, 64B, current PI circuitry 66A, 66B, and reverse-transform circuitry 68. Controller device 10 may also include additional elements not shown in FIG. 1, such as Clarke-transform circuitry 70, flux estimator and PLL circuitry 72, and PWM circuitry 74.

Velocity control loop 50 may be configured to generate reference torque signal 26 based on estimate angular velocity 20 and target angular velocity 22. Subtraction circuitry 12 is configured to generate error signal 24 based on a difference between estimated angular velocity 20 and target angular velocity 22. PI circuitry 14 is configured to generate reference torque signal 26 based on error signal 24. Processing circuitry 16 is configured to determine that rotor 32 is locked based on detecting that reference torque signal 26 includes a saturated amplitude for at least a threshold time. Reference-value circuitry 52 may be configured to generate a target torque signal based on reference torque signal 26. The target torque signal may include a quadrature-axis component that is perpendicular to a field flux linkage component of the electrical currents through the field windings of electric motor 30. For purposes of this disclosure, the "torque axis" may refer to the quadrature axis. Reference-value circuitry 52 may be further configured to generate a target direct signal that is parallel to the field flux linkage component. In some examples, the target direct signal may have zero or near-zero amplitude to accentuate the torque component of the electrical current through the field windings.

Current control loop 60 may be configured to generate an alpha voltage and a beta voltage based on the target torque signal and the target direct signal from reference-value circuitry 52, an estimated torque current and an estimated direct current from Clarke-transform circuitry 70, and an estimated rotor angle from flux estimator and PLL circuitry 72. Clarke-transform circuitry 70 may be configured to generate an estimated alpha current and an estimated beta current based on the electrical currents through the field windings of electric motor 30. Park-transform circuitry 62 may be configured to generate the estimated torque current and an estimated direct current based on the estimated alpha current, the estimated beta current, and the estimate rotor angle from flux estimator and PLL circuitry 72.

Subtraction circuitry 64A may be configured to generate a torque error signal based on a difference between the target torque signal and the estimated torque current. PI circuitry 66A may be configured to generate a torque voltage based on the torque error signal. Subtraction circuitry 64B may be configured to generate a direct error signal based on a difference between the target direct signal and the estimated direct current. PI circuitry 66B may be configured to generate a direct voltage based on the direct error signal. Reverse-transform circuitry 68 may be configured to generate an alpha voltage and a beta voltage based on the torque voltage and the direct voltage. PWM circuitry 74 may be configured to generate PWM signals based on the alpha voltage and a beta voltage.

The alpha and beta axes may be a fixed two-dimensional coordinate system that corresponds to dimensions of electric motor. A Clarke transform may convert the electrical currents from one or more field windings of electric motor 30 to vectors in the alpha and beta axes. The torque and direct axes may be a two-dimensional coordinate system that is continuously reset to align with the varying field flux linkage component of the electrical currents through the field windings of electric motor 30. A Park transform may convert vectors in the alpha and beta axes to vectors in the torque and direct axes. A reverse Park transform may convert the vectors back to the alpha and beta axes, and a reverse Clarke transform may convert the vectors back to the dimensions of the field windings of electric motor 30.

Figure 3:
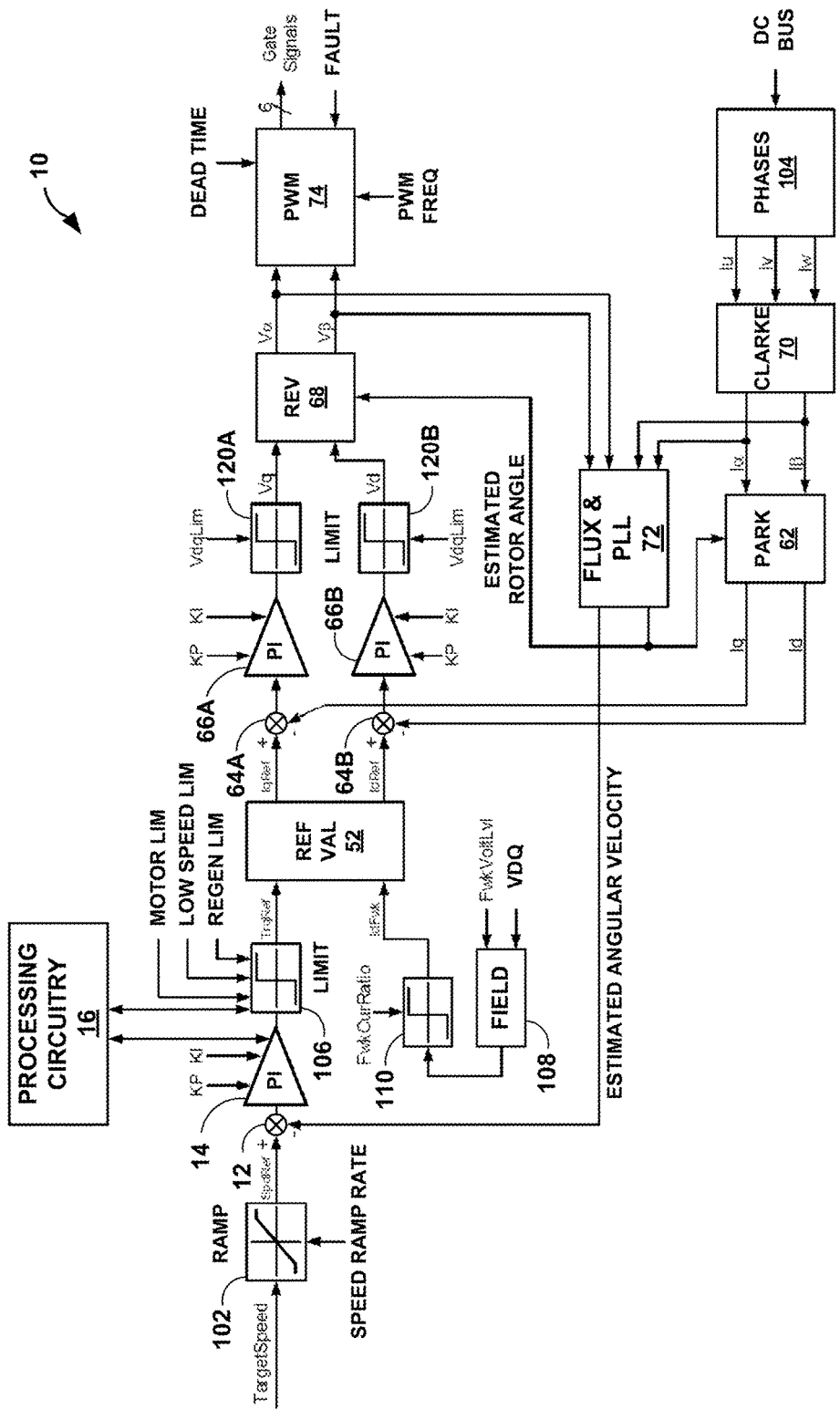
FIG. 3 is a conceptual block diagram of a controller device implementing field-oriented control (FOC), in accordance with some examples of this disclosure.

FIG. 3 is a conceptual block diagram of controller device 10 implementing FOC, in accordance with some examples of this disclosure. FIG. 3 depicts additional detail for controller device 10 including speed ramp element 102, phase reconstruction element 104, limit elements 106, 110, 120A, 120B, and field weakening element 108.

Speed ramp element 102 may generate a target angular velocity signal based on target angular velocity 22. Speed ramp element 102 may include limits for the target angular velocity signal. Speed ramp element 102 may transmit the target angular velocity signal to subtraction circuitry 12. Phase reconstruction element 104 may simulate or reconstruct the electrical current through the field windings of electric motor 30 by generating the electrical current signals based on the direct-current (DC) bus current. Phase reconstruction element 104 may transmit the electrical current signals to Clarke-transform circuitry 70.

Limit element 106 may modify reference torque signal 26 only if reference torque signal 26 is greater than an upper limit or less than a lower limit. If reference torque signal 26 is outside the limits, limit element 106 may set reference torque signal 26 equal to the limit amplitude. Processing circuitry 16 may monitor PI circuitry 14 and/or limit element 106 to detect that reference torque signal 26 includes a saturated amplitude for at least a threshold time. Each of limit elements 110, 120A, 120B may be configured to generate an output signal based on applying an upper limit and a lower limit to an input signal. Field weakening element 108 and limit element 110 may generate and transmit a direct field weakening current to reference values 52.

Figure 4:
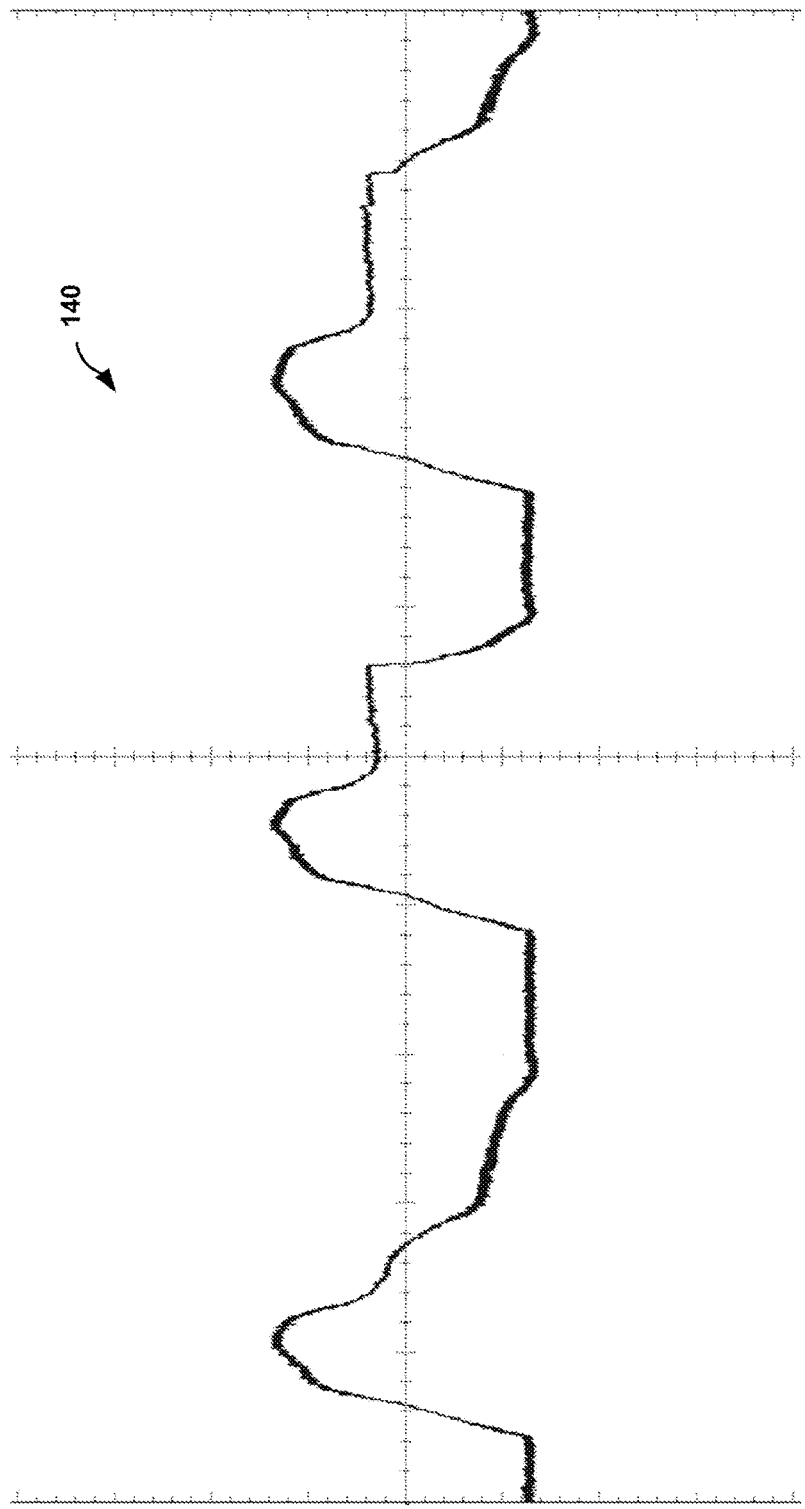
FIG. 4 is a graph of electrical current in a field winding of an electrical motor, where the estimated angular velocity of the rotor is less than one hundred revolutions per minute (RPM).

FIG. 4 is a graph 140 of electrical current in a field winding of an electrical motor, where the estimated angular velocity of the rotor is less than one hundred revolutions per minute (RPM). Graphs 140, 160, 180 of FIGS. 4-6 may depict a time period of two seconds on the horizontal axis. Graphs 140, 160, 180 may depict the amplitude of the electrical current on the vertical axis.

In the example of graph 140, the rotor may be locked and vibrating at a frequency of approximately fourteen hundred millihertz. The rotor may be vibrating due to the electric motor attempting to increase the angular velocity of the rotor. The rotor may be partially obstructed such that the angular velocity is greater than zero, but the angular velocity may remain less than the target angular velocity, causing the reference torque signal to saturate.

In some examples, the flux estimator and PLL may generate an estimated angular velocity that is not accurate. In some examples, if the actual angular velocity is zero, the flux estimator and PLL may generate a nonzero estimated angular velocity. Thus, without the techniques of this disclosure, processing circuitry of a controller device may have difficulty in detecting rotor lock because of the inaccurate estimates of angular velocity from the flux estimator and PLL.

Figure 5:
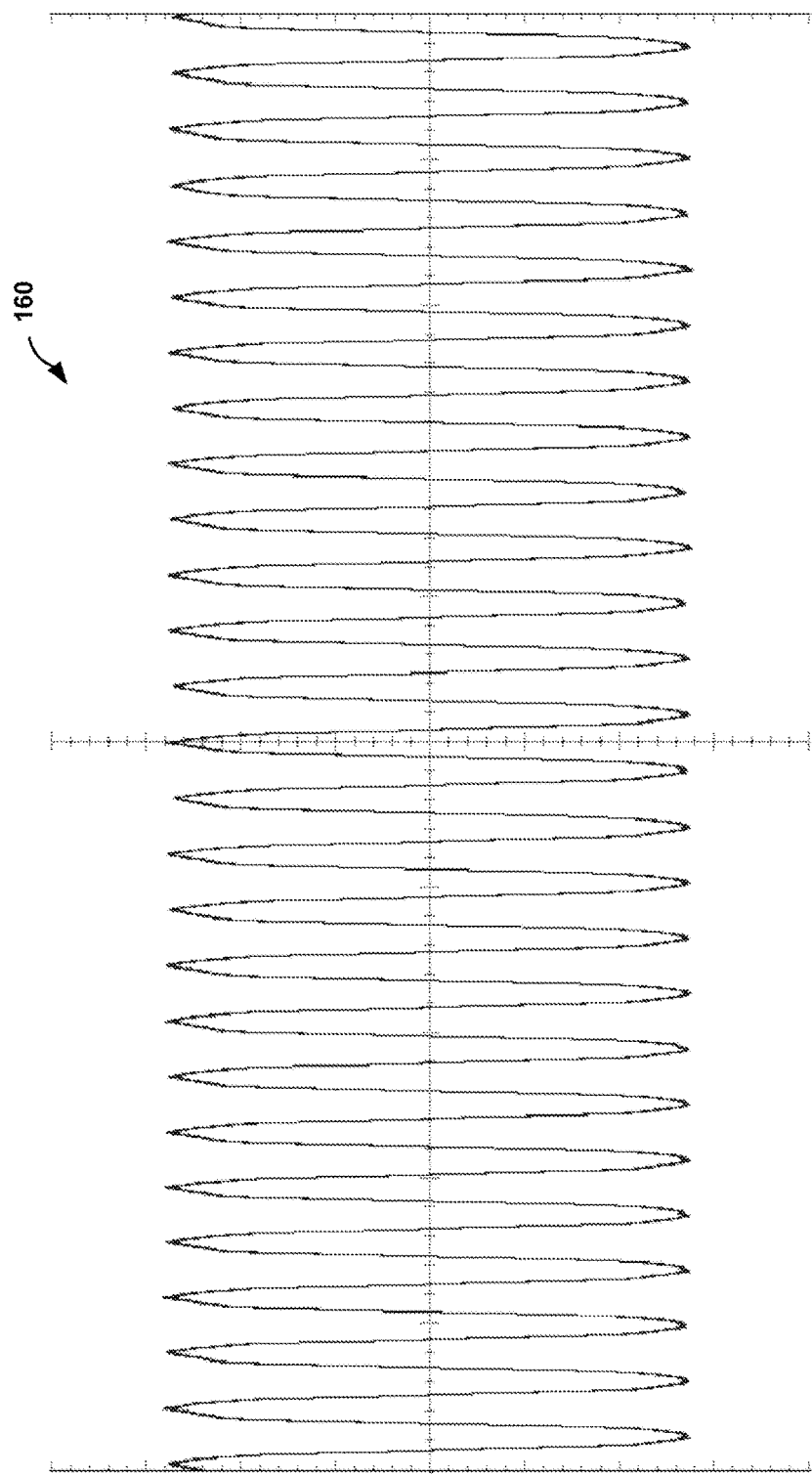
FIG. 5 is a graph of electrical current in a field winding of an electrical motor, where the estimated angular velocity of the rotor is approximately two hundred RPM.

FIG. 5 is a graph 160 of electrical current in a field winding of an electrical motor, where the estimated angular velocity of the rotor is approximately two hundred RPM. In the example of graph 160, the rotor may be locked and vibrating at a frequency of approximately thirteen hertz. The rotor may be vibrating due to the electric motor attempting to increase the angular velocity of the rotor. The rotor may be partially obstructed such that the angular velocity is greater than zero. For angular velocities of approximately two hundred RPM, the controller device may not determine that the rotor is locked unless the target angular velocity is substantially higher than two hundred RPM. For relatively low target angular velocities, the reference torque signal may not saturate because the actual angular velocity may be nearly equal to the target angular velocity.

Figure 6:
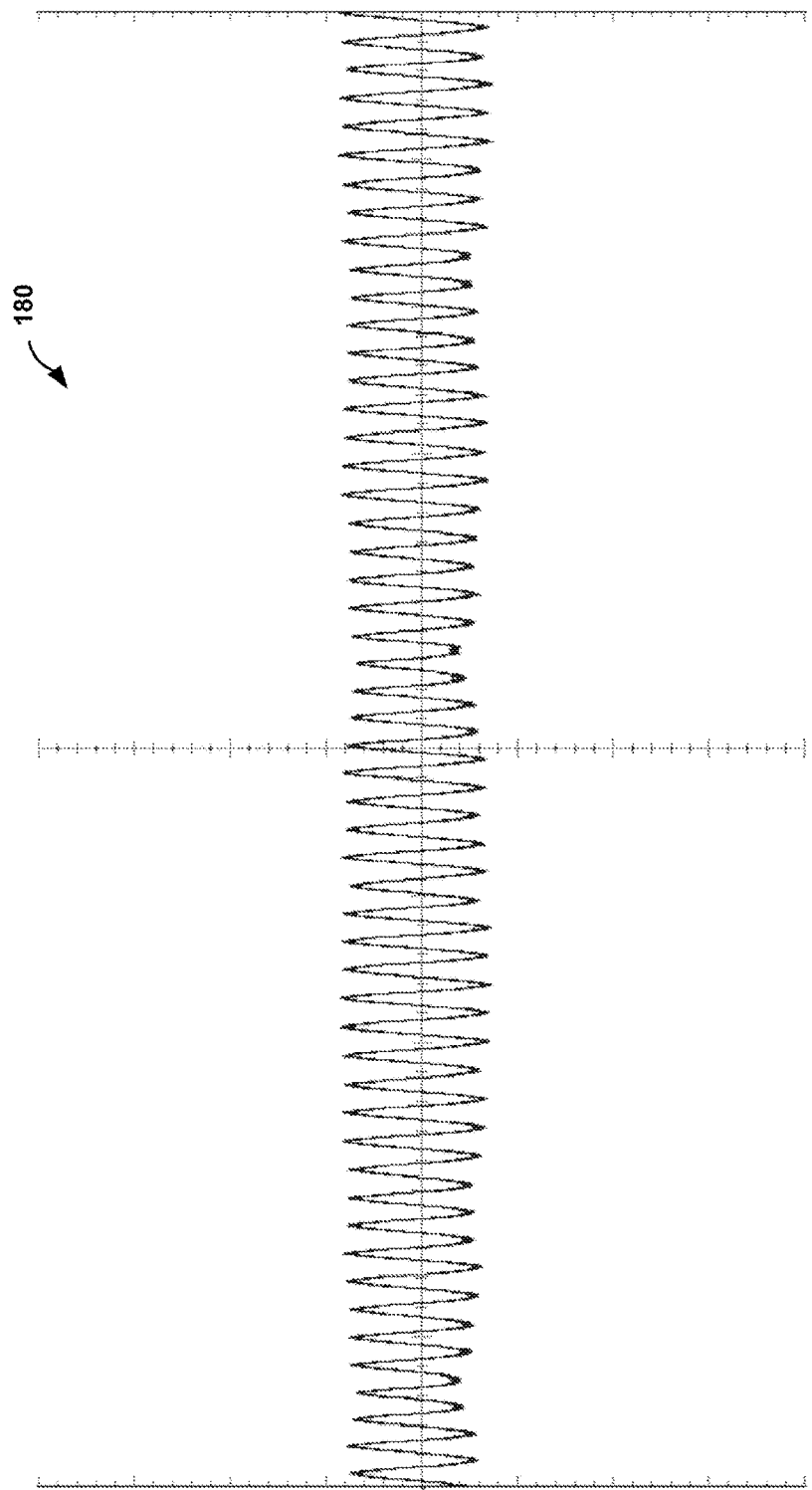
FIG. 6 is a graph of electrical current in a field winding of an electrical motor, where the estimated angular velocity of the rotor is greater than three hundred RPM.

FIG. 6 is a graph 180 of electrical current in a field winding of an electrical motor, where the estimated angular velocity of the rotor is greater than three hundred RPM. In the example of graph 180, the rotor may be locked and vibrating at a frequency of approximately twenty-seven hertz. The rotor may be vibrating due to the electric motor attempting to increase the angular velocity of the rotor. The rotor may be partially obstructed such that the angular velocity is greater than zero. For angular velocities of greater than three hundred RPM, the controller device may determine that the PLL is out of control based on a vibration in the estimated angular velocity. The PLL may be out of control by being locked at a high speed, which may prevent the saturation of the reference torque signal.

In some examples, a controller device of this disclosure may detect rotor lock at slower angular velocities than can be achieved with conventional techniques. In some examples, the controller device may include a threshold angular velocity, where the threshold angular velocity may be two hundred RPM, three hundred RPM, or any other suitable angular velocity. For purposes of this disclosure, "slower" angular velocities may be less than or equal one hundred RPM, "mid-range" angular velocities may be greater than one hundred RPM and less than or equal to three hundred RPM, and "higher" angular velocities may be greater than three hundred RPM. The processing circuitry of the controller device may be configured to determine that the rotor is locked by first determining that the estimated angular velocity is less than a threshold angular velocity. When the rotor includes an angular velocity that is greater than the threshold angular velocity, the processing circuitry may refrain from determining rotor lock based on the reference torque signal.

Figure 7:
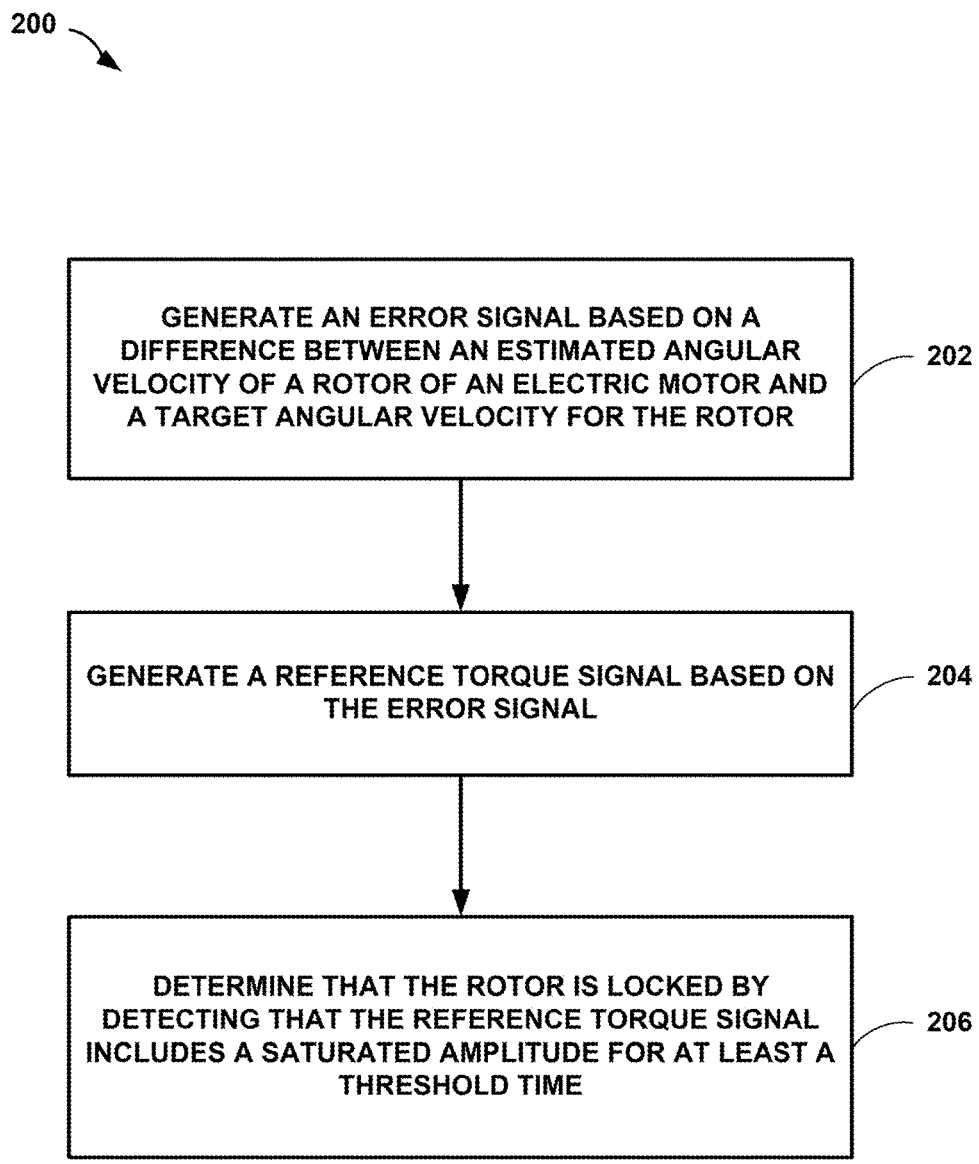
FIG. 7 is a flowchart illustrating an example technique for determining that a rotor is locked, in accordance with some examples of this disclosure.

FIG. 7 is a flowchart illustrating an example technique 200 for determining that a rotor is locked, in accordance with some examples of this disclosure. Technique 200 is described with reference to controller device 10 in FIGS. 1-3, although other components may exemplify similar techniques.

The technique of FIG. 7 includes generating error signal 24 based on a difference between estimated angular velocity 20 of rotor 32 and target angular velocity 22 for rotor 32 (202). Flux estimator and PLL 72 may generate estimated angular velocity 20 based on inputs from Clarke-transform circuitry 70 and reverse-transform circuitry 68. Subtraction circuitry 12 may include digital logic components and/or analog components configured to generate error signal 24. Error signal 24 may indicate whether, and by how much, estimated angular velocity 20 is less (or more) than target angular velocity 22.

The technique of FIG. 7 further includes generating reference torque signal 26 based on the error signal 24 (204). Velocity PI circuitry 14 may generate reference torque signal 26 by integrating error signal 24 over time, amplifying error signal 24, and adding the integrated signal and the amplified signal. Velocity PI circuitry 14 may include digital logic components and/or analog components, such as a resistive-capacitive circuit and/or an operational amplifier.

The technique of FIG. 7 also includes detecting that reference torque signal 26 includes a saturated amplitude for at least a threshold time (206). Processing circuitry 16 may be configured to monitor reference torque signal 26. If processing circuitry 16 detects that reference torque signal 26 is saturated, processing circuitry 16 may set a timer to expire at the end of the threshold time. If processing circuitry 16 detects that reference torque signal 26 is no longer saturated before the expiry of the timer, processing circuitry may disable the timer. If the timer expires and reference torque signal 26 is still saturated, processing circuitry 16 may determine that rotor 32 is locked.

The technique of FIG. 7 may allow controller device 10 to detect rotor lock without any additional equipment or hardware. When processing circuitry 16 detects rotor lock, controller device may output an alert or diagnostic information to a user. The technique of this disclosure may be suitable for various applications, including low-speed electric motors.

The techniques of this disclosure may be implemented in a device or article of manufacture comprising a computer-readable storage medium. The term "processing circuitry," as used herein may refer to any of the foregoing structure or any other structure suitable for processing program code and/or data or otherwise implementing the techniques described herein. Elements of controller device 10 and/or processing circuitry 16 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein. Processing circuitry may also include analog components arranged in a mixed-signal IC.

Controller device 10 and processing circuitry 16 may include memory. One or more memory devices of the memory may include any volatile or non-volatile media, such as a RAM, ROM, non-volatile RAM (NVRAM), electrically erasable programmable ROM (EEPROM), flash memory, and the like. One or more memory devices of the memory may store computer readable instructions that, when executed by the processing circuitry, cause the processing circuitry to implement the techniques attributed herein to the processing circuitry.

Elements of controller device 10 and/or processing circuitry 16 may be programmed with various forms of software. The processing circuitry may be implemented at least in part as, or include, one or more executable applications, application modules, libraries, classes, methods, objects, routines, subroutines, firmware, and/or embedded code, for example. The processing circuitry may be configured to receive voltage signals, determine switching frequencies, and deliver control signals.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

The following numbered examples demonstrate one or more aspects of the disclosure.

EXAMPLE 1

A controller device is configured to generate control signals for a power-conversion circuit that drives an electric motor including a rotor. The controller device includes subtraction circuitry configured to generate an error signal based on a difference between an estimated angular velocity of the rotor and a target angular velocity for the rotor. The controller device further includes PI circuitry configured to generate a reference torque signal based on the error signal. The controller device also includes processing circuitry configured to determine that the rotor is locked based on detecting that the reference torque signal includes a saturated amplitude for at least a threshold time.

EXAMPLE 2

The controller device of example 1, wherein the processing circuitry is configured to determine that the rotor is locked by at least determining that the estimated angular velocity is less than a threshold angular velocity.

EXAMPLE 3

The controller device of example 2, wherein the threshold angular velocity is greater than twenty percent of a maximum angular velocity of the rotor and less than thirty percent of the maximum angular velocity.

EXAMPLE 4

The controller device of examples 1-3 or any combination thereof, wherein the processing circuitry is configured to detect that the reference torque signal includes the saturated amplitude for at least the threshold time by at least sampling the reference torque signal and determining that the reference torque signal includes the saturated amplitude for a threshold number of samples.

EXAMPLE 5

The controller device of examples 1-4 or any combination thereof, wherein the PI circuitry is configured to generate the reference torque signal by at least generating a proportional signal by at least amplifying the error signal, generating an integrated signal by at least integrating the error signal over time, and adding the proportional signal to the integrated signal to generate the reference torque signal.

EXAMPLE 6

The controller device of examples 1-5 or any combination thereof, further including a flux estimator configured to generate an estimated velocity signal based on the estimated angular velocity of the rotor, wherein the subtraction circuitry is configured to generate the error signal based on a difference between the estimated velocity signal and a target velocity signal that is based on the target angular velocity for the rotor.

EXAMPLE 7

The controller device of examples 1-6 or any combination thereof, wherein the processing circuitry is configured to set a bit based on determining that the rotor is locked.

EXAMPLE 8

A method for determining that a rotor of an electric motor is locked, the method including generating an error signal based on a difference between an estimated angular velocity of the rotor and a target angular velocity for the rotor. The method further includes generating a reference torque signal based on the error signal, and detecting that the reference torque signal includes a saturated amplitude for at least a threshold time.

EXAMPLE 9

The method of example 8, further including determining that the estimated angular velocity is less than a threshold angular velocity.

EXAMPLE 10

The method of examples 9, wherein the threshold angular velocity is greater than twenty percent of a maximum angular velocity of the rotor and less than thirty percent of the maximum angular velocity.

EXAMPLE 11

The method of examples 8-10 or any combination thereof, wherein detecting that the reference torque signal includes the saturated amplitude for at least the threshold time includes sampling the reference torque signal and determining that the reference torque signal includes the saturated amplitude for a threshold number of samples.

EXAMPLE 12

The method of examples 8-11 or any combination thereof, wherein generating the reference torque signal includes generating a proportional signal by at least amplifying the error signal; generating an integrated signal by at least integrating the error signal over time; and adding the proportional signal to the integrated signal to generate the reference torque signal.

EXAMPLE 13

The method of examples 8-12 or any combination thereof, further including generating an estimated velocity signal based on the estimated angular velocity of the rotor, wherein generating the error signal based on the difference between the estimated angular velocity and the target angular velocity includes generating the error signal based on a difference between the estimated velocity signal and a target velocity signal that is based on the target angular velocity for the rotor.

EXAMPLE 14

The method of examples 8-13 or any combination thereof, further comprising setting a bit based on determining that the rotor is locked.

EXAMPLE 15

A system includes an electric motor including a rotor and field windings, power-conversion circuitry configured to drive the electric motor, and a controller device configured to generate control signals for the power-conversion circuit. The controller device includes subtraction circuitry configured to generate an error signal based on a difference between an estimated angular velocity of the rotor and a target angular velocity for the rotor. The controller device further includes velocity PI circuitry configured to generate a reference torque signal based on the error signal. The controller device also includes processing circuitry configured to determine that the rotor is locked based on detecting that the reference torque signal includes a saturated amplitude for at least a threshold time.

EXAMPLE 16

The system of example 16, wherein the controller device further includes a current control loop including torque-axis PI circuitry configured to generate a PI torque signal based on a target torque signal and an estimated torque signal. The current control loop further includes direct-axis PI circuitry configured to generate a direct voltage based on a target direct signal and an estimated direct signal. The current control loop also includes reverse transform circuitry configured to transform the PI torque signal and the direct voltage to an alpha voltage and a beta voltage. The controller device also includes modulation circuitry configured to generate control signals based on the alpha voltage and the beta voltage. The controller device includes a velocity control loop including the subtraction circuitry, the velocity PI circuitry, and reference-value circuitry configured to generate the target torque signal based on the reference torque signal.

EXAMPLE 17

The system of examples 15-16 or any combination thereof, wherein the processing circuitry of the controller device is configured to determine that the rotor is locked by at least determining that the estimated angular velocity is less than a threshold angular velocity.

EXAMPLE 18

The system of examples 15-17 or any combination thereof, wherein the processing circuitry of the controller device is configured to detect that the reference torque signal includes the saturated amplitude for at least the threshold time by at least sampling the reference torque signal; and determining that the reference torque signal includes the saturated amplitude for a threshold number of samples.

EXAMPLE 19

The system of examples 15-18 or any combination thereof, wherein the velocity PI circuitry is configured to generate the reference torque signal by at least generating a proportional signal by at least amplifying the error signal, generating an integrated signal by integrating the error signal over time, and adding the proportional signal to the integrated signal to generate the reference torque signal.

EXAMPLE 20

The system of examples 15-19 or any combination thereof, wherein the controller device further comprises a flux estimator configured to generate an estimated velocity signal based on the estimated angular velocity of the rotor, and wherein the subtraction circuitry is configured to generate the error signal based on a difference between the estimated velocity signal and a target velocity signal that is based on the target angular velocity for the rotor.

Various examples of the disclosure have been described. Any combination of the described systems, operations, or functions is contemplated. These and other examples are within the scope of the following claims.

What is claimed is:

1. A controller device configured to generate control signals for power-conversion circuitry that drives an electric motor including a rotor without a sensor to sense a position of the rotor or a velocity of the rotor, the controller device comprising:
   a flux estimator and phase-lock loop (PLL) configured to determine an estimated angular velocity of the rotor, wherein the controller device is further configured to:
   generate an error signal based on a difference between the estimated angular velocity and a target angular velocity for the rotor;
   generate a reference torque signal based on the error signal, wherein the controller device further comprises processing circuitry configured to:
      determine that the reference torque signal includes a saturated amplitude;
      in response to determining that the reference torque signal includes the saturated amplitude, set a timer to expire after a threshold time;
      determine that the reference torque signal includes the saturated amplitude after the timer expires; and
      determine that the rotor is locked based on determining that the reference torque signal includes the saturated amplitude after the timer expires.

2. The controller device of claim 1, wherein the processing circuitry is configured to determine that the rotor is locked by at least determining that the estimated angular velocity is less than a threshold angular velocity.

3. The controller device of claim 2, wherein the threshold angular velocity is less than thirty percent of the maximum angular velocity.

4. The controller device of claim 1, wherein the processing circuitry is configured to determine that the reference torque signal includes the saturated amplitude after the timer expires by at least:
   sampling the reference torque signal; and
   determining that the reference torque signal includes the saturated amplitude for a threshold number of samples.

5. The controller device of claim 1, wherein the controller device is configured to generate the reference torque signal by at least:
   generating a proportional signal by at least amplifying the error signal;
   generating an integrated signal by at least integrating the error signal over time; and
   adding the proportional signal to the integrated signal to generate the reference torque signal.

6. The controller device of claim 1, wherein the processing circuitry is configured to set a bit based on determining that the rotor is locked.

7. A method for determining that a rotor of an electric motor is locked without a sensor to sense a position of the rotor or a velocity of the rotor, the method comprising:
   determining an estimated angular velocity of the rotor by a flux estimator and phase-lock loop (PLL);
   generating an error signal based on a difference between an estimated angular velocity of the rotor and a target angular velocity for the rotor;
   generating a reference torque signal based on the error signal;
   determining that the reference torque signal includes a saturated amplitude;
   in response to determining that the reference torque signal includes the saturated amplitude, setting a timer to expire after a threshold time; and
   determining that the reference torque signal includes the saturated amplitude after the timer expires.

8. The method of claim 7, wherein determining that the rotor is locked comprises determining that the estimated angular velocity is less than a threshold angular velocity.

9. The method of claim 8, wherein the threshold angular velocity is less than thirty percent of the maximum angular velocity.

10. The method of claim 7, wherein determining that the reference torque signal includes the saturated amplitude after the timer expires comprises:
    sampling the reference torque signal; and
    determining that the reference torque signal includes the saturated amplitude for a threshold number of samples.

11. The method of claim 7, wherein generating the reference torque signal comprises:
    generating a proportional signal by at least amplifying the error signal;
    generating an integrated signal by at least integrating the error signal over time; and
    adding the proportional signal to the integrated signal to generate the reference torque signal.

12. A system comprising:
    an electric motor including a rotor and field windings;
    power-conversion circuitry configured to drive the electric motor; and
    a controller device configured to generate control signals for the power-conversion circuit without a sensor to sense a position of the rotor or a velocity of the rotor, the controller device including:
    a flux estimator and phase-lock loop (PLL) configured to determine an estimated angular velocity of the rotor, wherein the controller device is further configured to:
    generate an error signal based on a difference between an estimated angular velocity and a target angular velocity for the rotor;
    generate a reference torque signal based on the error signal, wherein the controller device further includes processing circuitry is configured to:
  determine that the reference torque signal includes a saturated amplitude;
  in response to determining that the reference torque signal includes the saturated amplitude, set a timer to expire after a threshold time;
  determine that the reference torque signal includes the saturated amplitude after the timer expires; and
  determine that the rotor is locked based on determining that the reference torque signal includes the saturated amplitude after the timer expires.

13. The system of claim 12, wherein the controller device further includes:
  a current control loop configured to:
    generate a PI torque signal based on a target torque signal and an estimated torque signal;
    generate a direct voltage based on a target direct signal and an estimated direct signal; and
    transform the PI torque signal and the direct voltage to an alpha voltage and a beta voltage,
  wherein the controller device is configured to generate control signals based on the alpha voltage and the beta voltage,
  wherein the controller further includes a velocity control loop configured to:
    generate the error signal based on the difference between the estimated angular velocity and the target angular velocity;
    generate the reference torque signal based on the error signal; and
    generate the target torque signal based on the reference torque signal.

14. The system of claim 12, wherein the processing circuitry of the controller device is configured to determine that the rotor is locked by at least determining that the estimated angular velocity is less than a threshold angular velocity.

15. The system of claim 12, wherein the processing circuitry of the controller device is configured to determine that the reference torque signal includes the saturated amplitude after the timer expires by at least:
  sampling the reference torque signal; and
  determining that the reference torque signal includes the saturated amplitude for a threshold number of samples.

16. The system of claim 12, wherein the controller device is configured to generate the reference torque signal by at least:
  generating a proportional signal by at least amplifying the error signal;
  generating an integrated signal by integrating the error signal over time; and
  adding the proportional signal to the integrated signal to generate the reference torque signal.

17. The controller device of claim 1, wherein the processing circuitry is configured to determine that the reference torque signal includes the saturated amplitude after the timer expires by at least:
  continuously monitoring the reference torque signal during the threshold time; and
  refraining from determining that the rotor is locked if the reference torque signal becomes unsaturated before an end of the threshold time.

18. The controller device of claim 1,
  wherein the processing circuitry is further configured to:
    determine that the reference torque signal does not include the saturated amplitude before the timer expires; and
    disable the timer in response to determining that the reference torque signal does not include the saturated amplitude before the timer expires.

19. The controller device of claim 3, wherein the threshold angular velocity is greater than ten percent of the maximum angular velocity of the rotor.

20. The method of claim 7, wherein determining that the reference torque signal includes the saturated amplitude for at least the threshold time by at least:
  continuously monitoring the reference torque signal during the threshold time; and
  refraining from determining that the rotor is locked if the reference torque signal becomes unsaturated before an end of the threshold time.

* * * * *